Figure 1:
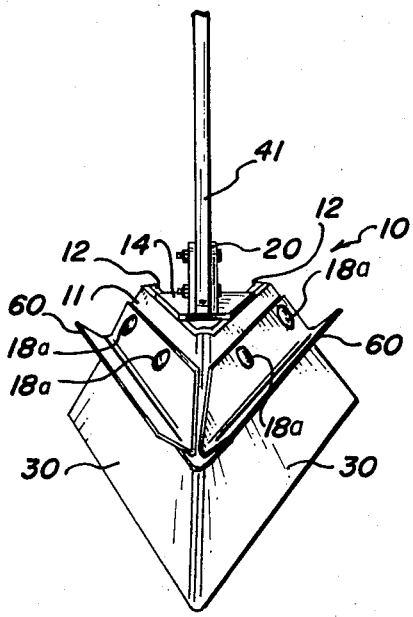

United States Patent [19]
Hawkins

[11] 3,713,497
[45] Jan. 30, 1973

[54] REPLACEABLE BLADE ROW CROP DITCHER WITH BEDDING RAIL

[75] Inventor: Roy I. Hawkins, Pierce, Colo.
[73] Assignee: Hawkins Mfg. Inc., Pierce, Colo.
[22] Filed: July 29, 1971
[21] Appl. No.: 167,102

[52] U.S. Cl. .............. 172/719, 172/722, 172/753, 172/759
[51] Int. Cl. .............. A01b 39/14, A01b 32/22
[58] Field of Search......172/176, 701, 719, 724, 731, 172/753, 757, 759, 769, 770, 761, 772, 733; 306/1.5–1.6

[56] References Cited

UNITED STATES PATENTS

| | | | |
|---|---|---|---|
| 90,271 | 5/1869 | Kennedy | 172/759 |
| 662,131 | 11/1900 | Noble et al. | 172/722 |
| 2,020,841 | 11/1935 | Lier | 172/719 |
| 2,096,766 | 10/1937 | Self | 172/722 |
| 2,431,639 | 11/1947 | Goedken | 172/719 |
| 2,673,511 | 3/1954 | Roberts | 172/722 |
| 2,764,924 | 10/1956 | Degge | 172/722 |
| 2,884,082 | 4/1959 | Osterhaus | 172/719 |
| 3,005,502 | 10/1961 | Teal | 172/731 |
| 3,174,558 | 3/1965 | Nelson | 172/722 |
| 3,556,229 | 1/1971 | Hawkins | 172/730 |

FOREIGN PATENTS OR APPLICATIONS

| | | | |
|---|---|---|---|
| 540,395 | 9/1949 | Canada | 172/722 |

Primary Examiner—Robert E. Pulfrey
Assistant Examiner—C. W. Hanor
Attorney—Wilbur A. E. Mitchell

[57] ABSTRACT

An Agricultural V-Shape Crop Ditcher Tool having a replaceable blade held between spring-tensioned members that are normally held apart, and a bedding rail attached to each wing of the tool to control lateral movement of the soil.

5 Claims, 5 Drawing Figures

INVENTOR
ROY I. HAWKINS

ATTORNEY

INVENTOR
ROY I. HAWKINS

ATTORNEY

REPLACEABLE BLADE ROW CROP DITCHER WITH BEDDING RAIL

This invention relates to Row Crops Ditchers, Furrow Openers or Corrigators in the farming industry, generally, and in this embodiment, more particularly, to a Replaceable Blade Row Crop Ditcher used mainly in the irrigated farming areas, where an irrigation ditch is formed between spaced and growing rows of farm crops. My invention is an improvement on my prior U.S. Pat. No. 3,556,229, on replaceable blade combination for duck-foot chisel, in the dry land farming art, and as well as on my co-pending application, Ser. No. 155 of Series of 1960, continuation of said patent, by way of adapting my novel replaceable blade previously developed in the dry land farming tool art in a Cultivator or Ditcher Tool used in the irrigated farming art.

In row crop farming, of such crops as beans, corn, sugar beets and the like, as soon as the crops grow an inch or two, as well as later in various growing stages, the farmer has to cultivate laterally between the rows thereof, usually by a conventional cultivator attached to the cross bar of a modern tractor and usually cultivating a plurality of rows in one operation. In the central portion of the United States and other areas of adequate rainfall a slight cultivator plowing of the surface between slightly growing rows is sufficient. But in the areas of the Western and Southwestern United States and other areas of less than adequate rainfall, where constant irrigation of crops during the growing season is required in addition to a so-called cultivating of the crops, another step is required, namely, the making of adequate small irrigation ditches, usually between every other row of growing crops. The farmer connects a source of irrigation water at the higher end of such row irrigation ditches and runs the water in those ditches to irrigate the crops.

The formation of such lateral row irrigation ditches has to be carefully made so as to not damage the growing crops. For that purpose, heretofore, a straight plane ditcher has been used, to form the ditch between a pair of growing rows, but, so far as known, same has at the same time thrown dirt up on top of each growing row and thus damaged or thereby blighted the small growing crop. To overcome that crop damage, I have developed my novel row crop ditcher having a so-called bedding-rail on each side thereof, which prevents a so-called splashing or excess spreading of the dug dirt from the newly formed ditch, formed by my ditcher, from being pushed too far outwardly or onto the growing rows.

Also heretofore conventional ditchers have become worn out too rapidly, due to hard compacted or heavy soil conditions and the presence of gravel in the soil, and as a result the entire ditcher unit had to be discarded too often and a new one purchased. To overcome that difficulty, I have designed my novel irrigated row crop replaceable ditcher blade of a nature whereby the cutting edge portion thereof may be replaced with a new one, without having to completely discard the entire unit, and thereby save considerable expense for the farmer. I have developed my novel V-shaped replacement cutting edge portion, in combination with my V-shaped row-crop plow ditcher having my novel bedding rail protector.

Normally, a ditcher, of the type and for the purpose described, is of a pointed or V-shaped wedge-like construction, to be pulled through the ground, to thus drag-form an irrigation ditch. A plurality of those ditchers is mounted on the conventional tool push or tow bar of a tractor, as the case may be, so that there is one usually between each growing row, usually about every 20 to 22 inches apart, so as to form a ditch between growing rows as the tractor proceeds down the field in the rows. Each of my ditchers is substantially adapted to form a ditch from 2 to 12 inches wide and of shallow or comparatively deep depth, depending upon the size ditcher being used and a setting of its rigid vertical shank bar, in turn rigidly secured to the tractor tow or push bar.

It is a principal object of my invention to provide a novel row crop ditcher unit having a replaceable blade portion in combination with my novel bedding rail protector thereon, with the latter designed to prevent the dirt from the thereby newly formed ditch by my ditcher from sliding completely up and over the ditcher and from being pushed onto the adjacent growing crop rows on each side of the new ditch.

Another object of my invention is to provide a novel adapter clamp combination with my V-shaped ditcher so as to permit removal of the cutting edge of the ditcher upon a wearing thereof and the installation of a new blade in lieu thereof.

Other objects will be apparent to those skilled in the art from the following explanation and the drawing, in which:

FIG. I is an elevational front view of my novel replaceable blade row crop ditcher;

FIG. II is a side view thereof, showing attachment of the pivotally adjustable rigid shank carrying arm, and which arm has its upper end conventionally adapted to be secured to and carried by a tractor horizontal tool bar;

FIG. III is a reduced exploded view of the parts of my novel ditcher;

FIG. IV is an enlarged elevational rear view thereof; and

FIG. V is a cross sectional view taken on the line 5 — 5 of FIG. IV.

Throughout the drawings, like reference numbers will be used to designate like parts.

It is to be borne in mind that heretofore, in the dry land replaceable blade chisel art, as in my heretofore referred to patent, a rigid frog-foot has been provided on the underside of the tractor carrying unit for, carrying such a blade unit thereon, and to accomplish a replaceable blade the chisel blade unit and including its spring tensioned matrix rested on top of and was carried by said frog-foot, with the matrix yoke of the unit being operable on and above that frog-foot carrier. Further, in the use of the heretofore conventional replaceable chisel blades, in the dry land farming industry, in each instance of use, the dirt is forced completely up onto the front of and over the chisel blade unit as the blade is pushed through the soil.

In my novel adaptation of my novel replaceable blade for irrigated farming tool use, in the making of an irrigation ditcher, for example as herein, for use between a pair of growing rows of a farm crop, I have provided that the dirt will be substantially prevented from being thrown outwardly from the ditcher, to prevent covering up the growing parallel rows on each side of the ditcher as the ditch is dug. I have perfected a novel combination having a bedding rail on each side of my wedge shape irrigated row crop ditcher, to assure that the dirt flared thereby does not spread out too far and thus damage the crop rows, but that, instead, as the ditch is formed thereby that the dug dirt is thereby substantially bedded in place, instead of being flared outwardly. That so-called bedding causes more friction against my novel ditcher then would normally otherwise occur and thus results in a quicker wearing of the lower extremity of the ditcher or of the cutting edges thereof. I have therefore designed my novel row crop ditcher as having a replaceable cutting edge or blade, meaning, that the lower extremity thereof can be removed from the unit without having to discard the expensive remaining upper part of the unit, when the lower cutting edge becomes too worn to be useful.

With the foregoing explanations in mind, I will now explain the parts of my novel Replaceable Blade Row Crop Bedding Rail Ditcher.

Figure 2:
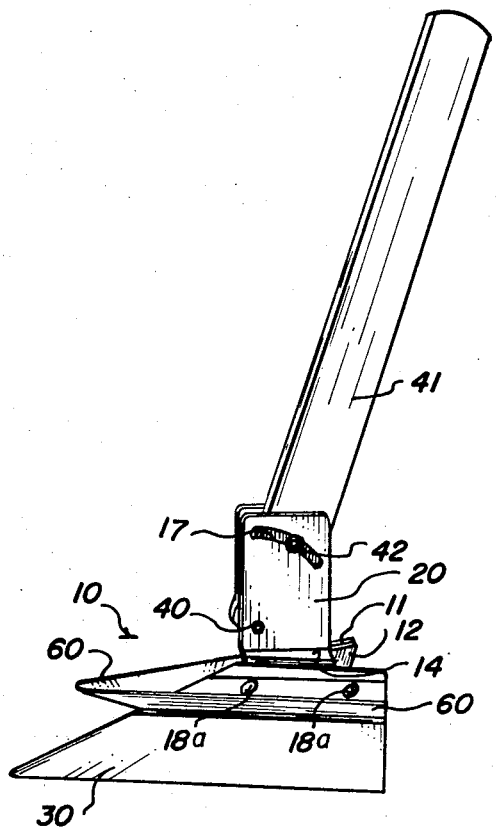
Figure 3:
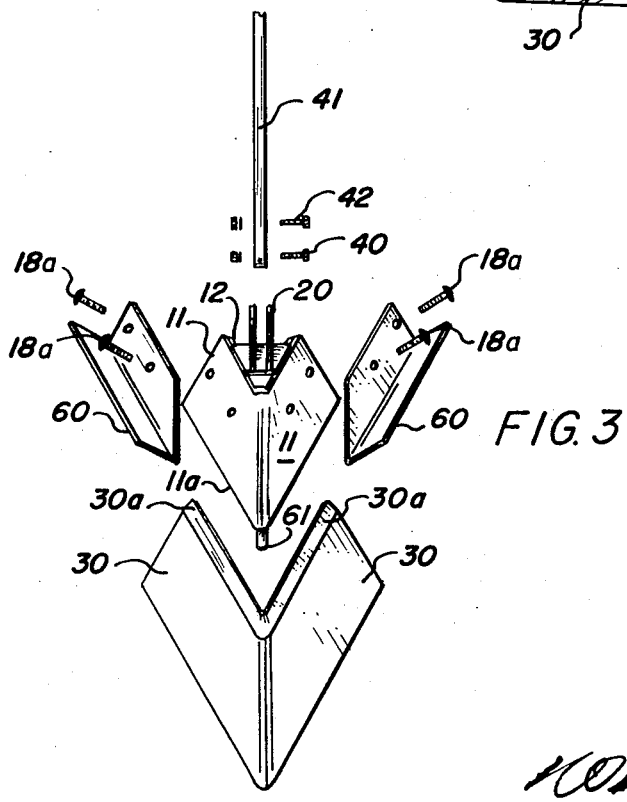

I conventionally suitably, rigidly and downwardly mount an extended arm or shank 41, carried by and from a conventional horizontal tool bar mounted on a tractor, not illustrated. That tool bar is usually conventionally adjustable, in terms of being rotatable and so as to be set in any rotational adjustment thereof. The shank 41 is a rigid spoke or radial extension from such a tool bar. I pivotally adjustably mount each one of my novel row crop ditchers at the lower end of each of such a shank arm 41, by pivoting same between a parallel pair of spaced ears 41 mounted, as by welding, on the upper part of my blade, as shown in FIG. 2. The lower end of each arm 41 is conventionally pivoted by a suitable pivot bolt 40 to and between the lower portions of spaced members 20. A parallel pair of identical bayonet curved slot openings 17 are formed in the upper portion of members 20. As illustrated in FIG. 2, I rigidly secure the ditcher to arm 41 by means of a locking stud-bolt 42, having an enlarged head on one outer end and a conventional lock washer and nut on its other threaded end. Bolt 42 has a lock nut and extends through the bayonet slots 17, and with the bolt through an opening in 41 provided for the purpose, as illustrated, for thus fixedly locking the vertical angular positioning of my blade unit 10 upon lock nut setting of that bolt, as desired, by a holding of my members 20, on and with relation to the arm 41, for reason to be explained.

I secure the members 20 vertically rigidly, as by welding, in spaced parallel relation to each other, at their lower ends to a transverse rigid plate 14. My ditcher, indicated generally as 10, hangs as a rigid part of and from said plate 14, by being secured thereto, as will be explained. I provide a first or upper rigid horizontal V or wedge-shaped blade portion 11, with its upper edges securely rigidly welded at 15 to the underside of cross plate 14, as shown in FIG. IV. I then provide a spring tensioned hinge flap 12 at the rear side of each wing of that wedge blade 11. I weld the upper edge of each flap 12 to the adjacent upper parallel edge of a side of said first V-shaped blade 11, by conventionally welding said edges together at 13 and with the lower edge of each flap 12 during that welding being held in spaced parallel relationship out and away from the adjacent parallel lower portion of that side of blade 11, in the dotted line position of 12 shown in FIG. 4. It will thus be seen that the welded edge acts as a spring-tensioned hinge for purpose of normally holding each flap 12 in open position, as so illustrated in dotted lines of FIG. 4. I provide a plurality of compression bolts as holding means for compressing a flap 12 against its said hinge tension and against its adjacent wing side, of 11 when the bolt is secured in place, as illustrated. Each bolt is inserted through an aligned pair of openings formed in each of outer blade 11 and also through the inner or rear adjacent hinge flap 12, as illustrated. On the front or outer surface of 11, each bolt has an enlarged rounded head 18a, and the other or under side end of each bolt is conventionally screw-threaded and provided with a lock washer and conventional screw-nut at that end. Thus, when a compression bolt is tightened, by a turning of its nut on the threads of its bolt to affect a tightening thereof then the hinge flap 12 thereunder will be swung on its hinge edge and tightly held against the adjacent wing 11 back side of the V-ditcher blade 11 against the spring-tension of spring-weld-hinge upper edge of 12. It is to be noted that each of my novel hinge flaps 12 are not directly secured to the rigid cross member 14, as is each wing of my blade 11, but each hinge flap is free to hingedly move on and by its weld hinge, so that, as explained, when the nut 18 of each bolt is released that then the spring-tension of the weld hinge will cause the flap 12 to normally be thereby positioned in the dotted line outward position, as at 50 of FIG. IV, or in open position of that hinge flap, for reason to be explained.

I provide a rigid bedding rail 60, at substantially a right angle projection from the exterior of each wing of my novel ditcher 11, as illustrated, and for the reason, heretofore given, to cause the dirt from the newly dug ditch by operation of my ditcher to be thereby bedded or prevented from being spread out onto the newly growing adjacent row. I form those bedding rails of suitable cross-sectional angle iron and removeably secure them to blade 11, as illustrated.

I provide spaced openings in the upright flange portion of each rail 60, adapting the compression bolt 18 to be extended therethrough, so that the enlarged head of a bolt is on the outside of the rail, for a suitable holding of the bedding rail to blade 11, as illustrated. I form each bedding rail substantially of a 2 inch angle iron. The front ends of each bedding rail 60 at the wedge apex point of my unit 10, as illustrated in FIG. 1, abut each other but are not attached together. I weld a rigid coupler rod finger member 61 to the under rear side of the inner front prow edge of my first or upper wedge shape ditcher blade 11, and so that it protrudes downwardly a slight distance, as shown in FIG. IV, and as will be explained.

Figure 4:
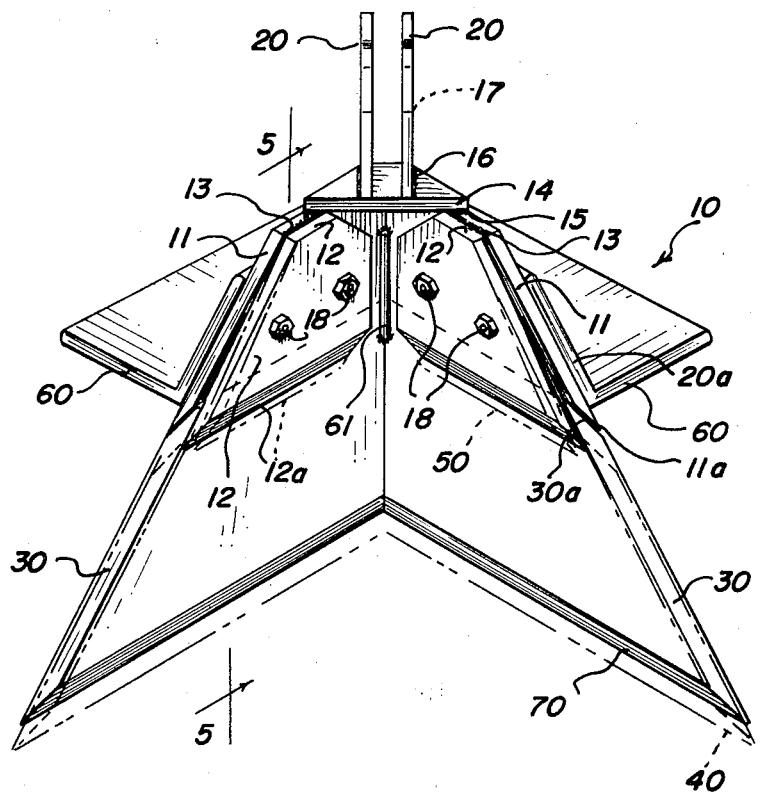
Figure 5:
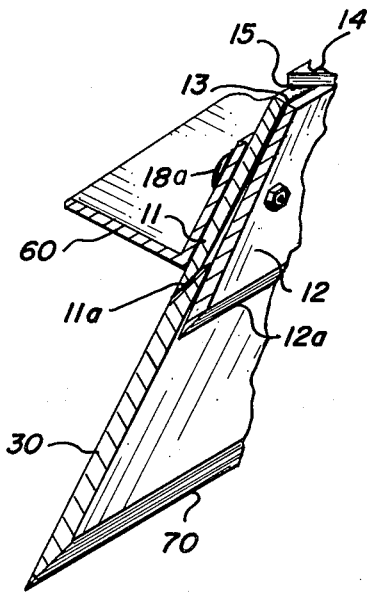

As illustrated in FIGS. IV and V, the lower half 30, of my novel V-wedge-shaped ditcher unit 10, is similarly formed and horizontally shaped and of extended plane and angular configuration to align with my first or upper blade 11 thereof. Lower blade 30 is adapted to be inserted upwardly into the same plane extended position with blade 11, as shown in FIG. IV. The upper edge of lower blade 30 has an inclined bevelled edge and aligns with and abuts with the lower inclined bevelled edge of upper blade 11, and with its upper edge positioned between the lower edge 12a of hinge flap 12, of each wing of the first unit 11, and the lower edge of that wing of upper blade 11, and with the front appex of the lower unit 30 positioned so that the coupler shank 61 of 11 is inside of the appex of 30, as shown. It will thus be apparent that it will be necessary to release each of the compression nuts 18, to thus open each hinge flap 12, by its spring tension hinge 13, as shown in dotted lines of FIG. 4, when desired to replace a worn lower blade 30 from therebetween. Upon such a loosening of the nut-bolts 18 and thus hinge 13 spring-opening of the hinge flaps 12, the lower blade unit 30 will be released and can be taken downwardly out from between 11 and 12 on each side and then a new blade 30 can be inserted upwardly therebetween in its stead. After insert of the new blade 30 into that upward position, as illustrated in FIG. 4, with its upper bevelled edges abutting the lower bevelled edges of the upper blade 11 and between those edges of wings 11 and hinge-flaps 12, then each bolt nut can be screw-tightened to securely clampingly thereby hold the unit together as a composite single solid rigid unit. That holding is accomplished by the hinge clamps 12 being held tightly against their adjacent respective back sides of the inside of the lower blade 30, by each of hinge-flaps 12 being compressed by its bolts 18 against its spring-tension-weld-hinge 13, and thus the lower blade 30 is held rigidly to and as a solid extended part of the upper blade 11, as illustrated in solid lines in FIGS. 4 and 5. I provide the bevelled lower edges of the upper blade unit 11 and also aligned bevelled upper edges of the lower unit 30, as illustrated, to assist in that straight line or extended plane solid holding, of 30 to 11, by flaps 12 on such bolt compression, just explained. It is to be further noted that each hinge flap 12 has its lower edge 12a extending downwardly on the inside of unit 10 to a point below the lower edges 11a of the top blade or first unit 11. Thereby that wedge holding of the upper edges of lower unit 30 in extension of and to upper unit 11 upon a tight compression of flaps 12 to 11, with 30 pressed in between them, caused by the locking full threading of the nuts 18 on their respective bolts, is better fulcrum accomplished, on ditcher use of my unit 10, when pressure rearwardly of the unit at lower edges 70 occurs.

I proportion a usual size of my novel irrigation row crop ditcher: with each lower edge 70, on each side, being about sixteen inches long; with the open end of the V-wedge at its rear, as shown in FIG. 4, being about 12 inches horizontally apart at said lower edges; with each side of the unit 10 wedge being at about a 45 degree angle to the vertical; and with said side of the wedge being about five inches in vertical measurement height from its lower edge 70 to the plate 14.

However I do not wish to be bound by those exact sizes or by the illustrated angular relationship nor positioning of the bedding rails 60, as a great variance can be made therein, within the teachings hereof.

It will be seen, in FIGS. 1 and 2, that when the lower edge of my novel unit 10 is held by its arm 41 with that lower edge in a horizontal position, and with the tractor tool bar adjusted so that as the tractor moves forwardly, that said lower edge of my ditcher 10 is in the ground, that a flat ditch will be formed thereby. Also, that if my unit 10 is adjusted and held with its left hand wedge apex point, as illustrated in FIG. 2, fixed lower than the right portion thereof, that then a V-shaped ditch will be formed as the ditcher is pulled forwardly through the ground. Also that the farther my ditcher unit 60 is held into the ground, with its apex wedge lowermost, that a wider ditch will be made, within the limits of the total width between the spread ends of the wings of the V-unit 10.

It will be apparent that many changes and modifications may be made in my novel replaceable blade bedding rail row crop ditcher combination without diviating from the spirit and scope thereof. I, therefore, wish to be bound only by the hereunto appended claims.

What I claim and desire to secure by letter patent is:

1. In a replaceable blade row crop ditcher, in combination, a rigid carrier arm secured to and carried by a machine tool bar, a rigid plate pivotally adjustably carried by an end of said carrier arm, means for adjustably pivotally horizontally carrying said rigid plate thereby, a first angular wedge shape ditcher blade fixedly secured to and carried by said horizontal plate, a pair of spring-tensioned hinge-flaps with each secured to a rear side of said first wedge blade and with the lower edge of each flap extending below and normally held by its spring-hinge in spaced relation from its adjacent rear side of said blade, means for so spring-tensionally hinging an upper portion of each of said flaps to its adjacent rear portion of said first wedge blade, each of said hinge flaps and its adjacent portion of said first blade having aligned bolt openings therethrough, bolt compression means each extending through a pair of said aligned openings and adapted upon compression thereof to secure its hinge flap tightly against the rear of its portion of said first blade and against the spring tension of the hinge-flap, a bedding rail member protruding from and held to the outside portion of a side of said wedge first blade opposite from its rear hinge flap side and having an opening therein adapted also to receive a said bolt compression means extending therethrough for said bolt means also holding said bedding rail to said first flap upon said compression of the bolt compression means, and a second wedge shaped ditcher blade of similar angular configuration to said first blade and adapted to be held substantially in prolongation extension of the plane of the first blade by having its upper portion inserted between said hinge flaps and the lower portion of the first blade and adapted for being removably held therebetween as a contiguous plane part therewith upon a securement of each bolt compression means so securing its hinge-flap against the rear of said first blade.

2. In combination, in a row crop ditcher replaceable blade and bedding tool,
 a. a first earth ditcher tool blade having a lower edge and adjustably pivotally fixedly connected to and carried by a tool bar of a farm machine and adapted to be positioned to be held either horizontally or at an angle to and with relation to the direction of the machine travel;
 b. means for so adjustably pivotally connecting said blade to said tool bar;
 c. a spring-tensioned hinge-flap secured to the rear of the blade, with relation to the direction of machine travel, and adapted to have a part thereof normally tensionally held by its hinge in spaced relationship from said rear of said first blade;

c. an aligned bolt opening in each of said blade and said flap;

e. a compression bolt means extending through said openings and adapted on compression to bind the flap tightly to the blade and against its hinge tension;

f. a projected bedding rail secured to and extending from the front of said blade, in terms of direction of machine travel; and g. a second earth ditcher tool blade having an upper edge and formed substantially of similar configuration to the first blade and having its upper edge formed in alignment with the lower edge of the first blade and adapted to be removeably held substantially in plane alignment downwardly in continuation from and as an integral part of said first blade upon said second blade upper edge being inserted between said first blade lower edge and said hinge flaps with said compression bolt holding means removably securing the upper edge of the second blade between said hinge flaps and said first blade.

3. In a row crop ditcher replaceable blade and bedding tool, in combination, a rigid carrier arm secured to and carried by a tractor, a rigid plate means pivotally adjustably fixedly carried by the carrier arm, means for so pivotally adjustably fixedly carrying said plate, a first V-shaped ditcher blade having a lower inclined bevelled edge surface and fixedly secured to said plate, a second V-shaped ditcher blade having an upper inclined bevelled edge surface adapted to mate with the lower inclined edge surface of the first blade so as to form a continuous blade plane surface, holding means including a spring-tensioned normally open hinge carried by one or the other of said first or second blades for effecting a holding of said two blades together and against said tension to form such continuous blade plane surface, and a bedding rail attached onto one of said blades and adapted to control the lateral movement of the soil upon ditcher tool operation.

4. A row crop ditcher replaceable blade and bedding tool combination, as defined in preceeding claim 3, and characterized further by definition of said means for adjustably pivotally fixedly carrying the plate by the carrier arm including two identical spaced apart parallel members secured to and extending vertically from said rigid plate and to and between which parallel members said carrier arm is so adjustably pivotally fixedly carried.

5. In combination, in a row crop ditcher replaceable blade and bedding tool, a. a first earth V-shaped ditcher tool blade having a lower edge inclined surface and adjustably pivotally fixedly connected to and carried by a tool bar of a farm machine and adapted to be operably carried by said bar either horizontally or at an angle to and with relation to the direction of the machine travel;

b. means for so adjustably-pivotally fixedly connecting said blade to said tool bar;

c. a spring-tensioned hinge flap holding means secured to said first blade, and adapted to have a part thereof normally substantially held in spaced relationship from said first blade;

d. a bedding rail secured to and extending outwardly from the plane of the front of said first blade;

e. A second earth V-shaped ditcher tool blade having an inclined upper edge surface adapted to mate with the inclined lower edge surface of the first blade and formed substantially of similar configuration to the first blade and adapted to be removably held by the hinge flap holding means substantially in plane alignment downwardly in continuation from and as an integral part of said first blade upon said second blade upper edge inclined surface being inserted against the lower edge inclined surface on insert of said second blade upper edge between said first blade lower edge and said hold-ing means; and f. means extending between said first blade and said hinge flap holding means and secured to one or the other thereof for effecting a removable holding of the second blade to the first blade in said plane extension alignment by and between the hinge flap and the second blade.

* * * * *